ID_50 indicates the concentration
United States Patent Office 3,501,464
Patented Mar. 17, 1970

3,501,464
PYRAZINE DERIVATIVES
Bruno Camerino and Giorgio Palamidessi, Milan, Italy, assignors to Società Farmaceutici Italia, Milan, Italy, a corporation of Italy
No Drawing. Filed June 5, 1967, Ser. No. 643,400
Claims priority, application Italy, June 6, 1966, 18,725/66
Int. Cl. C07d 51/76
U.S. Cl. 260—239.7    3 Claims

ABSTRACT OF THE DISCLOSURE

Disclosed are the pyrazine derivatives, 2-sulfanilamido-pyrazine-4-oxide (I) and 2-sulfanilamido-pyrazine-1-oxide (II). These compounds have a high antibacterial activity on gram-positive and gram-negative schizomycetes and a very low toxicity so as to be usefully employed in human and veterinary therapy. The products are prepared by condensation of 2-chloro-pyrazine-4-oxide and -1-oxide respectively with sulfanilamide in the presence of a base, such as potassium carbonate, at about the melting point of the mixture, or by condensation with a sulfanilamide alkali salt in the presence of a solvent, such as acetamide.

---

Our present invention relates to new pyrazine derivatives having antibacterial activity and to the preparation thereof. More particularly, our invention has as an object 2-sulfanilamido-pyrazine-4-oxide (I) and 2-sulfanilamido-pyrazine-1-oxide (II) which have the following structural formula:

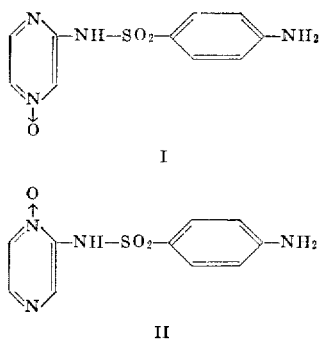

I

II

The products of the invention have a high antibacterial activity on gram-positive and gram-negative schizomycetes and a very low toxicity so as to be usefully employed in human and veterinary therapy.

Pyrazine sulfamides having antibacterial activity are described in the literature. It was an object of the present invention to find new pyrazine derivatives, which besides having a high antibacterial activity and a toxicity lower than that of the known analogous compounds, have a remarkable elimination ratio which makes them useful in sulfamidic therapy where the use of products having a non-delayed action is recorded.

The new products of the invention, 2-sulfanilamido-pyrazine-4-oxide (I) and 2-sulfanilamidopyrazine-1-oxide (II), are prepared by condensation of 2-chloro-pyrazine-4-oxide and -1-oxide respectively with sulfanilamide in the presence of a base, such as potassium carbonate, at about the melting point of the mixture, or by condensation with a sulfanilamide alkali salt in the presence of a solvent, such as acetamide, at the temperature of 140°–150° C. By subsequent acidification, the product thus obtained precipitates. The product is then isolated and purified by the known separation and purification techniques.

The following examples serve to illustrate the invention without limiting it.

EXAMPLE 1

2-sulfanilamidopyrazine-4-oxide (I)

1 mol of 2-chloropyrazine-4-oxide (L. Bernardi et al. Gazz. Chim. Ital. 91 (1961), page 1435) is mixed with 1.5 mols of sulfanilamide and 0.82 mol of potassium carbonate. The mixture is kept at the melting point of 145° C. for from 4 to 6 hours. When the reaction is over, the mixture is diluted with 200 cc. of water and it is acidified to pH 3.5 with 4 N HCl. The solid compound which precipitates is separated by filtration, washed with water and dried. 2-sulfanilamido-pyrazine-4-oxide, melting at 235–240° C., is obtained in a yield of 70% with respect to the starting 2-chloropyrazine - 4 - oxide. By recrystallization from ethanol, the product obtained melts at 240°–241° C. Unreacted 2-chloropyrazine-4-oxide is recovered from the mother liquors by extraction with chloroform.

EXAMPLE 2

2-sulfanilamidopyrazine-1-oxide (II)

Operating as in Example 1, but using 2-chloropyrazine-1-oxide (Bernardi et al. Gazz. Chim. Ital. 91, (1961), p. 1435) 2-sulfanilamidopyrazine-1-oxide melting at 220°–221° C. is obtained. Recrystallization from dioxane gives a product melting at 222° C.

The antibacterial activity of the products of the invention has been determined according to the tests described hereinbelow. The results of the tests are reported in tables in comparison with results obtained with the known sulfamide drug sulfamethopyrazine (2 - sulfanilamido-3-methoxy-pyrazine) described by B. Camerino et al., U.S. Patent 3,098,069.

Table 1 reports the values of the 50% inhibition dose ($ID_{50}$), in vitro, expressed in μg. per cc. of liquid medium having the composition described by Capps et al., J. Bact. 55 (1948), p. 869. The $ID_{50}$ indicates the concentration capable of reducing 50% of the development of the treated bacteria in respect to the controls.

TABLE I

| Strains | Sulfametho-pyrazine | $ID_{50}$ (μg./cc.) | |
|---|---|---|---|
|  |  | I | II |
| Staphylococcus aureus 114 | 10 | 25 | 50 |
| Staphylococcus aureus 153 | 10 | 25 | 17 |
| Escherichia coli | 5 | 25 | 22 |
| Shigella flexneri var. Y | 10 | 100 | 10 |
| Salmonella abortivo-equina | 28 | 50 | 25 |

Tests of the therapeutical activity of the products of the invention have been carried out on mice experimentally infected by intraperitoneal route with *Staphylococcus aureus* Camp, *Salmonella abortivo-equina* and *Plasmodium berghei*. The products have been administered orally by one treatment daily.

Table 2 reports the following obtained values:

TABLE 2

| Infection | Compound | Dose, mg./kg. | Days of treatment | LTR$_{50}$ | TD$_{50}$ mg./kg. | T.I. |
|---|---|---|---|---|---|---|
| Staphylococcus aureus Camp. | I | 200 | 1 | 2.41 | | |
|  | I | 50-100-200 | 5 | | 63 | 103 |
|  | Sulphamethopyrazine | 200 | 1 | 1.97 | | |
|  | Sulphamethopyrazine | 50-100-200 | 5 | | 49 | 34.69 |
| Salmonella abortivo-equina. | I | 200 | 1 | 2.12 | | |
|  | I | 50-100-200 | 5 | | 100 | 65 |
|  | II | 25-50-100 | 5 | | 170 | |
|  | Sulphamethopyrazine | 200 | 1 | 1.94 | | |
|  | Sulphamethopyrazine | 50-100-200 | 5 | | 100 | 17 |
| Plasmodium berghei. | I | 25-100-400 | 1 | | 80 | 81.2 |
|  | I | 6.25-25-100 | 5 | | 10 | 650 |
|  | Sulphamethopyrazine | 25-100-400 | 1 | | 75 | 22.6 |
|  | Sulphamethopyrazine | 6.25-25-100 | 5 | | 6.25 | 272 |
| Plasmodium berghei. | II | 25-100-400 | 1 | | 1200 | |
|  | II | 6.25-25-100 | 5 | | 25 | |
|  | Sulphamethopyrazine | 25-100-400 | 1 | | 400 | 4.25 |
|  | Sulphamethopyrazine | 6.25-25-100 | 5 | | 12 | 141.6 |

$$LTR_{50} = \frac{LT_{50}(\text{treated animals})}{LT_{50}(\text{controls})}$$

wherein LT$_{50}$ is the time within which 50% of the animals die.

TD$_{50}$ = therapeutic dose, expressed in mg./kg. of body weight, which administration causes a recovery of 50% of the treated animals.

$$T.I. = \frac{LD_{50}}{TD_{50}} =$$

therapeutic index expressed by the ratio between the lethal dose 50 (LD$_{50}$), that is the dose in mg./kg. able to cause the death of 50% of the treated animals, and the therapeutic dose 50.

The toxicity of 2-sulfanilamido-pyrazine-4-oxide intravenously determined in the mouse, and expressed as LD$_{50}$, is 6.5 g./kg., while that of sulfamethopyrazine is 1.7 g./kg. and that of sulfapyrazine is 0.630 g./kg.

Table 3 reports the values of therapeutical activity (expressed as ratio LTR$_{50}$) of the products of the invention in comparison to sulfapyrazine and to sulfamethopyrazine in the experimental infection of mice with Diplococcus pneumoniae, by carrying out only one treatment with the products under examination at the dose of 200 mg./kg. The infections have been carried out at various intervals, namely after 8, 24 and 48 hours from the administration of the products.

As results from Table 3, the elimination ratio of the two new products of the invention may be compared to that of sulfapyrazine while it is higher than that of sulfamethopyrazine. The products of the invention are useful in human and veterinary therapy. They are preferably administered by oral route, for instance in the form of powders, tablets, pills or capsules, in the presence of a suitable liquid or solid excipient or other pharmacologically acceptable substance.

At least 10 animals were used in each of the tests as reported by the tables above.

TABLE 3

| Compounds | LTR$_{50}$ | | |
|---|---|---|---|
|  | 8 | 24 | 48 |
| I | 1.42 | 1.05 | 1 |
| II | 1.57 | 1 | 1 |
| Sulfapyrazine | 1.52 | 1.05 | 1.05 |
| Sulfamethopyrazine | 2.10 | 1.47 | 1.44 |

We claim:

1. A compound selected from the group consisting of 2-sulfanilamidopyrazine-4-oxide and 2-sulfanilamidopyrazine-1-oxide.

2. The compound of claim 1, which is 2-sulfanilamidopyrazine-4-oxide.

3. The compound of claim 1, which is 2-sulfanilamidopyrazine-1-oxide.

References Cited

UNITED STATES PATENTS 3,098,069   7/1963   Camerino et al. ____ 260—239.7

HENRY R. JILES, Primary Examiner

C. M. SHURKO, Assistant Examiner

U.S. Cl. X.R.

260—250; 424—229